US011808427B2

(12) United States Patent
Schager et al.

(10) Patent No.: US 11,808,427 B2
(45) Date of Patent: Nov. 7, 2023

(54) OPTICAL SYSTEM FOR MOTOR VEHICLE HEADLIGHT

(71) Applicant: ZKW Group GmbH, Wieselburg (AT)

(72) Inventors: Alexander Schager, Scheibbs (AT); Thomas Edletzberger, Schollach (AT); Thomas Kern, Neidling (AT); Manuel Fahrngruber, Oberndorf an der Melk (AT); Daniel Mader, Neumarkt an der Ybbs (AT); Jürgen Wachsenegger, Oberndorf/Melk (AT); Patrick Wippel, Bergland (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/086,956

(22) Filed: Dec. 22, 2022

(65) Prior Publication Data
US 2023/0204175 A1 Jun. 29, 2023

(30) Foreign Application Priority Data
Dec. 23, 2021 (EP) .................................... 21217502

(51) Int. Cl.
*F21S 41/00* (2018.01)
*F21S 41/27* (2018.01)
*F21S 41/147* (2018.01)
*F21S 41/32* (2018.01)
*F21S 41/43* (2018.01)

(52) U.S. Cl.
CPC ............. *F21S 41/27* (2018.01); *F21S 41/147* (2018.01); *F21S 41/321* (2018.01); *F21S 41/43* (2018.01)

(58) Field of Classification Search
CPC ........ F21S 41/27; F21S 41/147; F21S 41/321; F21S 41/43
See application file for complete search history.

(56) References Cited

U.S. PATENT DOCUMENTS

2009/0097268 A1 4/2009 Mochizuki
2010/0002460 A1* 1/2010 Rosenhahn ........... F21S 41/255
362/521

(Continued)

FOREIGN PATENT DOCUMENTS

EP 3653926 A1 5/2020
JP 2008277130 A 11/2008

(Continued)

*Primary Examiner* — Gerald J Sufleta, II
(74) *Attorney, Agent, or Firm* — Eversheds Sutherland (US) LLP

(57) ABSTRACT

An optical system for a motor vehicle headlight, wherein the system includes at least two optical elements, including a light coupling area, a light decoupling area, a lateral surface which delimits the optical element and has an optically effective aperture edge for forming a bright/dark boundary in a far-field light distribution producible with the optical system. The system includes at least two anterior optics, wherein an anterior optic is associated with each optical element. The first anterior optic and first optical element are configured to produce a first far-field light distribution, wherein the second anterior optic and second optical element are configured to produce a second far-field light distribution, which lies below the bright/dark boundary of the first far-field light distribution.

20 Claims, 4 Drawing Sheets

(56) References Cited

U.S. PATENT DOCUMENTS

| | | | | |
|---|---|---|---|---|
| 2014/0009938 A1* | 1/2014 | Hossfeld | ............... | F21S 41/663 |
| | | | | 362/244 |
| 2017/0343174 A1 | 11/2017 | Owada | | |
| 2019/0017675 A1* | 1/2019 | Suwa | ...................... | F21S 41/24 |
| 2020/0063936 A1* | 2/2020 | Suwa | ...................... | F21S 41/43 |
| 2022/0299182 A1* | 9/2022 | Kemetmüller | ........ | F21S 41/285 |

FOREIGN PATENT DOCUMENTS

| | | |
|---|---|---|
| WO | 2020235609 A1 | 11/2020 |
| WO | 2021038855 A1 | 3/2021 |

\* cited by examiner

OPTICAL SYSTEM FOR MOTOR VEHICLE HEADLIGHT

CROSS-REFERENCE TO RELATED APPLICATIONS

This application claims priority to European Patent Application No. 21217502.0, filed Dec. 23, 2021, which is incorporated herein by reference.

FIELD OF THE INVENTION AND DESCRIPTION OF PRIOR ART

The invention relates to an optical system for a motor vehicle headlight, wherein the optical system includes at least two optical elements respectively comprising:
- a light coupling area, for coupling light beams into the optical element,
- a light decoupling area, for decoupling the light beams coupled into the optical element, wherein the light decoupling area is configured as a projection lens, which projection lens has an optical axis and a focal surface,
- a lateral surface delimiting the optical element for deflecting the light beams coupled into the optical element, which lateral surface extends between the light coupling area and the light decoupling area, wherein a section of the lateral surface is configured as a beam aperture with an optically effective aperture edge, wherein the optically effective aperture edge is designed so as to form a bright/dark boundary in a far-field light distribution producible with the optical system, wherein the section of the lateral surface configured as a beam aperture lies in a defined plane, wherein the projection lens and the beam aperture are arranged relative to each other in such a manner that the optical axis of the projection lens lies in the defined plane and the optically effective aperture edge of the beam aperture lies in the focal surface of the projection lens, wherein the optical system includes at least two anterior optics, wherein one, preferably exactly one, anterior optic is associated with each optical element, wherein each anterior optic includes a light source and is configured to direct the light of the light source onto the light coupling area of the optical element associated with it.

Generic optical systems are known in the prior art. Light distributions producible with the optical system generally meet determined legal regulations. If additional requirements that go beyond the legal requirements are to be met, additional lighting devices are usually provided that satisfy the additional requirement. However, this is associated with high costs.

SUMMARY OF THE INVENTION

The object of the present invention is to alleviate or eliminate the drawbacks of the prior art. An aim of the invention is thus in particular to provide an optical system with which the production of a light distribution is improved.

This object is achieved by means of an optical system with the features of claim 1. Preferred embodiments are indicated in the dependent claims.

According to the invention, a first anterior optic of the at least two anterior optics is configured to direct light beams of the light source associated with it in the form of a first light beam bundle along a first coupling direction onto the light coupling area of the optical element associated with it, wherein the first light beam bundle is bundled after the coupling via the light coupling area into an area of the optically effective aperture edge of the optical element in such a manner that the first light beam bundle exhibits the highest light beam density at the optically effective aperture edge, in a sectional plane orthogonal to the optical axis of the optical element, wherein a first part of the first light beam bundle is blocked by the beam aperture and a second part of the first light beam bundle passes the aperture edge and propagates in the direction of the projection lens, wherein the first coupling direction is oriented at a first coupling angle in relation to the optical axis of the optical element, wherein a second anterior optic of the at least two anterior optics is configured to direct light beams of the light source associated with it in the form of a second light beam along a second coupling direction onto the light coupling area of the optical element associated with it, wherein the second light beam bundle is bundled after the coupling via the light coupling area into an area of the optically effective aperture edge of the optical element in such a manner that the second light beam bundle exhibits the highest light beam density at the optically effective aperture edge, in a sectional plane orthogonal to the optical axis of the optical element, wherein a first part of the second light beam bundle is blocked by the beam aperture and a second part of the second light beam bundle passes the aperture edge and propagates in the direction of the projection lens, wherein the second coupling direction is oriented at a second coupling angle in relation to the optical axis of the optical element, wherein the first anterior optic and the first optical element are designed and configured so as to irradiate a first light bundle that forms a first far-field light distribution, wherein the first far-field light distribution exhibits a bright/dark boundary which is straight at least in sections and which lies at least partially, preferably entirely, below the HH line, wherein the second anterior optic and the second optical element are designed and configured so as to irradiate a second light bundle that forms a second far-field light distribution, wherein the second far-field light distribution lies below the bright/dark boundary of the first far-field light distribution.

This yields the advantage that a composite far-field light distribution can be produced with one and the same optical system. It can also be provided that a single optical element is associated with a plurality of anterior optics. These anterior optics can illuminate the light coupling area of the optical element symmetrically, but also asymmetrically. The coupling surface of the optical element can be configured to focus the incident light onto the optically effective aperture edge. The focal surface of the projection lens can be understood as a Petzval surface which has a certain curvature, wherein the aperture edge of the beam aperture follows the Petzval surface of the projection lens in such a manner that the aperture edge lies in the Petzval surface. This makes it possible to achieve a sharp rendering of the bright/dark boundary produced with the aperture edge. The total far-field light distribution producible with the optical system, which is composed of the first far-field light distribution and the second far-field light distribution, is in particular a low-beam light distribution.

It can be provided that the first far-field light distribution has a first gradient and the second far-field light distribution has a second gradient, wherein the first gradient is determined along a vertical section through the bright/dark boundary of the first far-field light distribution and the second gradient is determined along a vertical section through the bright/dark boundary of the second far-field light distribution, wherein the first gradient is smaller than the second gradient, wherein preferably the first far-field light distribution satisfies required brightness values in the points 50V and 50R in a low-beam light distribution. The quantification of a bright/dark transition of a light distribution occurs using the maximum of a gradient along a vertical section through the bright/dark boundary. To this end, the logarithm of the illumination intensity is calculated at measurements points at 0.1° intervals and the difference between the same is ascertained, which yields the gradient function. The maximum of this function is called the gradient of the BD boundary. Since this definition only renders human brightness perception imprecisely, it is possible for differently perceived BD lines to have an identical measured gradient value or for different gradients to be measured for similar-looking BD lines. Although a person skilled in the art is familiar with the significance and the determination of the gradient of a bright/dark boundary, reference is nevertheless made in this context to the UN ECE regulation "UN-R 123/02 Suppl. 2, pages 67-69". Reference is further made to "Berichte der Bundesanstalt für Straßenwesen, Fahrzeugtechnik Heft F 65, Entwicklung von Kriterien zur Bewertung der Fahrzeugbeleuchtung im Hinblick auf ein NCAP für aktive Fahrzeugsicherheit, Seite 37" (Reports of the German Federal Institute for Roadways, Automotive Engineering Issue F 65, Development of Criteria for the Evaluation of a Motor Vehicle Illumination with a View to an NCAP for Active Automotive Safety, p. 37).

It can be provided that the first light bundle, which forms the first far-field light distribution, at least partially overlaps with the second light bundle, which forms the second far-field light distribution, in the far field, which lies at a distance of 25 m from the optical system, wherein preferably the first light bundle and the second light bundle do not overlap in the near field, which lies at a distance of up to 200 mm in front of the optical system. The point 50V lies at horizontal 0° and vertical −0.86° on an ECE-compliant measurement screen. The point 50R lies at horizontal −1.72° and vertical −0.86° on an ECE-compliant measurement screen. A near field can be understood as an area closer than 10 times the length of the focal length of the projection lens.

It can be provided that the first optical element and the second optical element are identical in design. This yields the advantage of reducing production costs.

It can be provided that the first coupling angle and the second coupling angle are different. In particular, the first coupling angle can be smaller than the second coupling angle.

It can be provided that the optical axes of the first and second optical elements are oriented parallel to each other.

It can be provided that the first anterior optic and the second anterior optic are designed differently, wherein in particular light decoupling surfaces of the first and second anterior optics via which the light of the light source is irradiated in the direction of the respective optical element are designed to be different in size. This yields the advantage that the amount of light that can be coupled into the corresponding optical element can be varied via the size of the light decoupling surfaces.

It can be provided that the first anterior optic is arranged relative to the first optical element at a first distance, which is defined as the distance between a centre point of the light decoupling surface of the first anterior optic and a point of intersection of the optical axis of the first optical element with the aperture edge of the first optical element, and the second anterior optic is arranged relative to the second optical element at a second distance, which is defined as the distance between a centre point of the light decoupling surface of the second anterior optic and a point of intersection of the optical axis of the second optical element with the aperture edge of the second optical element, wherein the first distance is smaller than the second distance. Due to the greater distance of the second anterior optic from the second optical element, the second light bundle that can be irradiated with the second optical element and the second anterior optic can be wider than the first light bundle. Furthermore, the second light bundle can have a lower illumination intensity than the first light bundle. The total light bundle formed from the first light bundle and the second light bundle (which can form a total far-field light distribution, which can be formed from the first far-field light distribution and second far-field light distribution) can thus be wider and more homogeneous than the first light bundle.

It can be provided that the first optical element and the first anterior optic are arranged vertically above the second optical element and the second anterior optic. This yields the advantage of a particularly compact optical system.

It can be provided that the first optical element is arranged relative to the second optical element in such a manner that the projection lens of the first optical element is arranged so as to be offset relative to the projection lens of the second optical element along a direction with an orientation parallel to the optical axis of the first optical element.

It can be provided that the light coupling area of the first optical element and/or of the second optical element has a curved surface.

It can be provided that the light coupling area of the first optical element and/or of the second optical element is configured to have the shape of a spherical segment. This yields the advantage that the light coupling into the first optical element and/or into the second optical element can occur particularly efficiently.

It can be provided that the first light bundle which is producible with the first optical element and which forms the first far-field light distribution has a first horizontal irradiation angle and the second light bundle which is producible with the second optical element and which forms the second far-field light distribution has a second horizontal irradiation angle, wherein the first horizontal irradiation angle is smaller than the second horizontal irradiation angle. The horizontal irradiation angle can be understood as the irradiation width of the far-field light distribution in a horizontal plane. In other words, the second far-field light distribution can be wider than the first far-field light distribution. In particular, the first far-field light distribution can satisfy the legal (width) requirements and the second far-field light distribution can illuminate a wider area compared to the first far-field light distribution. It can be provided that the first optical element produces a central far-field light distribution and the second optical element produces a decentral far-field light distribution, wherein the decentral far-field light distribution is arranged at a left or right edge of the central far-field light distribution. In one embodiment, it is possible to provide three optical elements, wherein a second optical element illuminates an area to the left of the central far-field light distribution and a third optical element illuminates an area to the right of the central far-field light distribution. In this embodiment, a total far-field light distribution is composed of three far-field light sub-distributions, wherein the individual light sub-distributions can partially overlap.

It can be provided that the respective first and second far-field light distributions producible with the respective first and second optical elements each have a brightness maximum, wherein the optical axis of the second optical element is inclined relative to the optical axis of the first optical element at an angle of inclination which is greater than 0°, wherein the angle of inclination is such that the brightness maximum or brightness maximum range of the second far-field light distribution lie within the brightness maximum or brightness maximum range of the first far-field light distribution. In other words, the first optical element can be inclined relative to the second optical element, wherein the angle of inclination is preferably greater than 0°.

It can be provided that the angle of inclination is 0.1° to 0.5°, in particular 0.3°. The angle of inclination is preferably between 0.1° and 5°, in particular between 0.1° and 3°, particularly preferably between 0.1° and 1°.

It can be provided that a shading element is arranged between the first and the second optical element, which shading element is configured to block scattered light irradiated by the first anterior optic in the direction of the second optical element. The shading element can be a screen.

It can be provided that the light coupling area of the first optical element is delimited by, preferably four, side edges, wherein the uppermost side edge in the vertical direction (which can be referred to as the top edge) has at least one curved edge section preferably arranged between two non-curved edge sections, wherein preferably two side edges lying in a vertical plane, which lie below the uppermost side edge in a vertical direction, have a uniform concave or convex curvature, wherein in particular the lowermost side edge in the vertical direction, which is arranged opposite the top edge and which can be called the bottom edge, can be configured to be straight. The uppermost side edge in the vertical direction can have an essentially S-shaped progression. In particular, the uppermost side edge in the vertical direction has a non-constant or alternating curvature (a curvature that changes sign along the side edge), while the remaining side edges preferably have a constant curvature, which can be convex or concave. The lowermost edge in the vertical direction, the bottom edge, can be configured to be straight and in particular, in a direction parallel to the optical axis of the first optical element, be closer to the anterior optic than the top edge. The curved edge section makes it possible to reduce the light in the Seg10 (the intensity at vertical −4°) on a 25 m ECE measurement screen. This allows the light intensity to be homogenized at a, in particular horizontal, lower boundary of the light distribution.

It can be provided that the second optical element has a second light coupling area and a second optically effective aperture edge that lies vertically below its optically effective aperture edge, wherein light coupled into the optical element via the second light coupling area impinges on the second optically effective aperture edge, wherein the second aperture edge is configured to produce a further light distribution, in particular a signlight light distribution, in cooperation with the second anterior optic.

It can be provided that the first anterior optic and the second anterior optic respectively have a light decoupling surface arranged in the same plane, wherein the plane is arranged orthogonally to the optical axis of the first optical element.

It can be provided that the defined plane in which lies the section of the lateral surface that is formed as a beam aperture is essentially a horizontal plane in a state in which the optical system is installed in a motor vehicle headlight.

It can be provided that the light sources of the first and second anterior optics lie in the same, preferably flat, surface.

It can be provided that the light sources of the first and second anterior optics are arranged on the same, preferably flat, printed circuit board.

It can be provided that a motor vehicle headlight includes the optical system according to the invention.

In the sense of this disclosure, a far-field light distribution is understood to be a light distribution that is visible on a measurement screen, wherein the measurement screen (for testing the illumination produced by an optical system) is set up at a distance of 25 m in front of the optical system (or a motor vehicle headlight including the optical system) perpendicularly to the optical axis of the optical system. Reference is made in this regard to Regulation No. 1 of the United Nations Economic Commission for Europe (UN/ECE), which regulates the provisions for the approval of motor vehicle headlights for asymmetrical low-beam light and/or high-beam light.

In the context of this description, the terms 'top', 'bottom', 'horizontal', 'vertical' are to be understood as indications of the orientation when the optical system is arranged in the normal position of use after instalment in a motor vehicle headlight.

BRIEF DESCRIPTION OF THE DRAWINGS

The invention is described in further detail in the following with reference to a preferred, yet non-limiting example embodiment. The drawings show.

DETAILED DESCRIPTION OF EMBODIMENTS OF THE INVENTION

Figure 1:
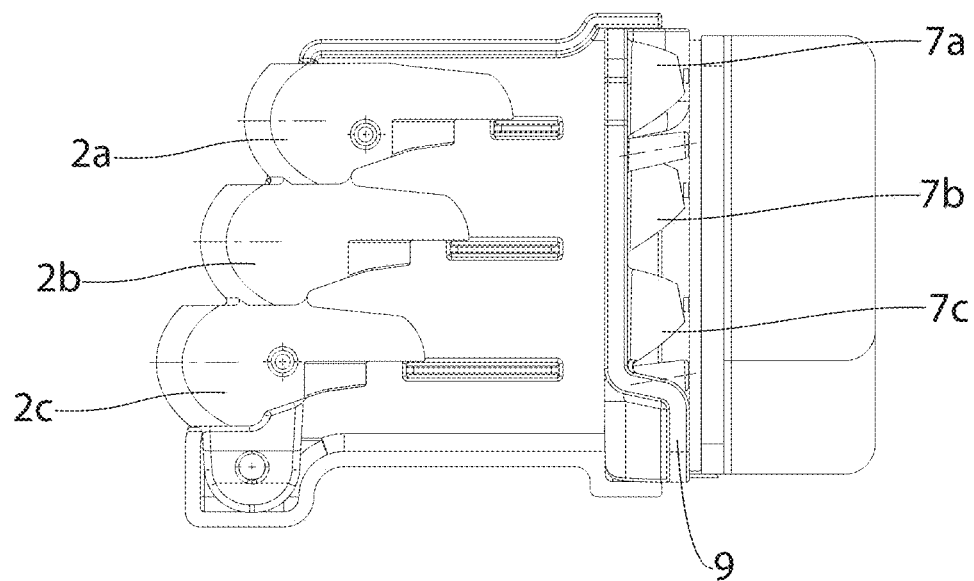
FIG. 1—a first embodiment of an optical system according to the invention.

FIG. 1 shows a first embodiment of an optical system 1 according to the invention for a motor vehicle headlight, wherein the optical system 1 includes at least two optical elements 2a, 2b, four optical elements 2a, 2b, 2c, 2d in the shown example embodiment. The optical elements 2a, 2b, 2c, 2d are preferably configured so as to be identical in design. In general, each embodiment can include at least two, preferably three, four or more optical elements 2 and anterior optics 7 associated with the optical elements 2.

Figure 3:
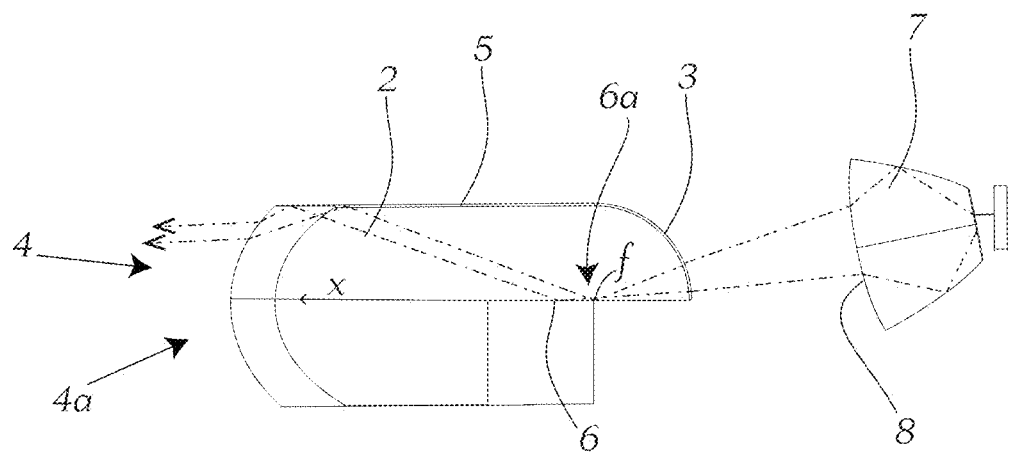
FIG. 3—a side view of an optical element with an anterior optic.
Figure 4:
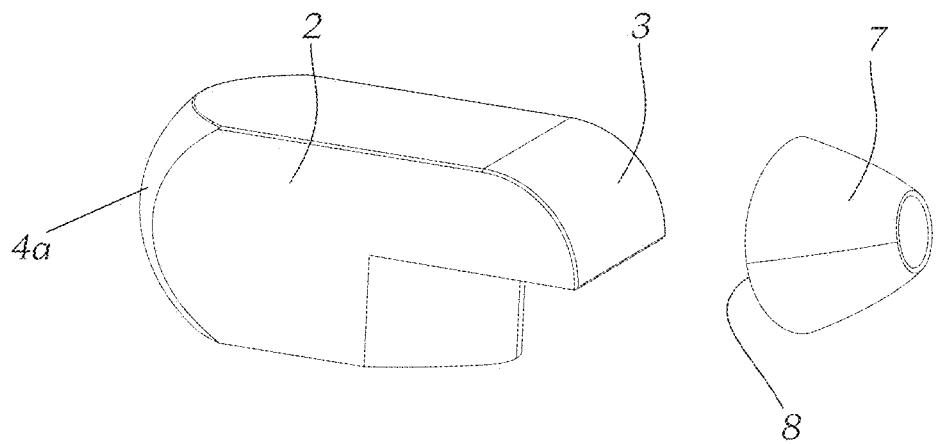
FIG. 4—a perspective view of the optical element with the anterior optic according to FIG. 3.

FIGS. 3 and 4 show detailed views of the optical element 2a.

Each of the four optical elements 2a, 2b, 2c, 2d shown has a light coupling area 3, for coupling light beams of a light source into the optical element 2a, 2b, 2c, 2d, and a light decoupling area 4, for decoupling the light beams coupled into the optical element 2a, 2b, 2c, 2d. The light decoupling area 4 is configured as a projection lens 4a, which projection lens 4a has an optical axis x and a focal surface f.

Each optical element 2a, 2b, 2c, 2d is delimited by a lateral surface 5 configured to deflect the light beams coupled into the optical element 2a, 2b, 2c, 2d. The lateral surface 5 extends between the light coupling area 3 and the light decoupling area 4, wherein a section of the lateral surface 5 is configured as a beam aperture 6 with an optically effective aperture edge 6a. The light coupling area 3 of each optical element 2a, 2b, 2c, 2d is configured as a curved surface.

The optically effective aperture edge 6a is configured to form a bright/dark boundary in a far-field light distribution producible with the optical system 1, wherein the section of the lateral surface 5 that is configured as a beam aperture lies in a defined plane. The defined plane is essentially a horizontal plane in a state in which the optical system 1 is installed in a motor vehicle headlight.

The projection lens 4a and the beam aperture 6 of the optical elements 2a, 2b, 2c, 2d are arranged relative to each other in such a manner that the optical axis x of the projection lens 4a lies in the defined plane and the optically effective aperture edge 6a of the beam aperture 6 lies in the focal surface f of the projection lens 4a, i.e. follows the Petzval surface of the projection lens 4a. The optical elements 2a, 2b, 2c, 2d are arranged relative to one another in such a manner that the projection lenses 4a of the optical elements 2a, 2b, 2c, 2d are arranged vertically below one another and offset horizontally relative to one another.

The optical system 1 has at least two anterior optics 7a, 7b, four anterior optics 7a, 7b, 7c, 7d in the example embodiment shown, wherein exactly one anterior optic 7a, 7b, 7c, 7d is associated with each optical element 2a, 2b, 2c, 2d, wherein each anterior optic 7a, 7b, 7c, 7d includes a light source and is configured to direct the light of the light source onto the light coupling area of the optical element 2a, 2b, 2c, 2d associated with it.

Each anterior optic 7a, 7b, 7c, 7d is configured to direct light beams of the light source associated with it in the form of a light beam bundle along a determined coupling direction onto the light coupling area of the optical element 2a, 2b, 2c, 2d associated with it, wherein the light beam bundle is bundled after the coupling via the light coupling area 3 in such a manner that the light beam bundle exhibits the highest light beam density at the optically effective aperture edge 6a, in a sectional plane orthogonal to the optical axis x of the optical element 2a. The coupling directions are respectively oriented at a coupling angle $\alpha1$-$\alpha4$ relative to the optical axis of the optical element 2a, 2b, 2c, 2d. The coupling angles $\alpha1$-$\alpha4$ can be different or identical. The anterior optics 7a, 7b, 7c, 7d are designed differently, wherein in particular the light decoupling surfaces 8 of the anterior optics 7a, 7b, 7c, 7d via which the light of the light source is irradiated in the direction of the optical element 2a, 2b, 2c, 2d are designed to be different in size.

The vertically uppermost anterior optic 7a and the optical element 2a associated with it are designed and configured so as to irradiate a first light bundle that forms a first far-field light distribution, wherein the first far-field light distribution has a bright/dark boundary which is straight at least in sections and which lies at least partially, preferably entirely, below the HH line.

The second anterior optic 7b and the second optical element 2b, which are arranged vertically below the uppermost optical element 2a, are designed and configured so as to irradiate a second light bundle that forms a second far-field light distribution, wherein the second far-field light distribution lies below the bright/dark boundary of the first far-field light distribution.

The first far-field light distribution has a first gradient and the second far-field light distribution has a second gradient, wherein the first gradient is smaller than the second gradient.

The first far-field light distribution satisfies required brightness values in particular in the points 50V and 50R of a low-beam light distribution. The first light bundle and the second light bundle overlap each other at least partially in the far field, which is at a distance of 25 m from the optical system 1. The first light bundle and the second light bundle do not overlap in the near field, which is at a distance of up to 200 mm in front of the optical system 1.

Figure 7:
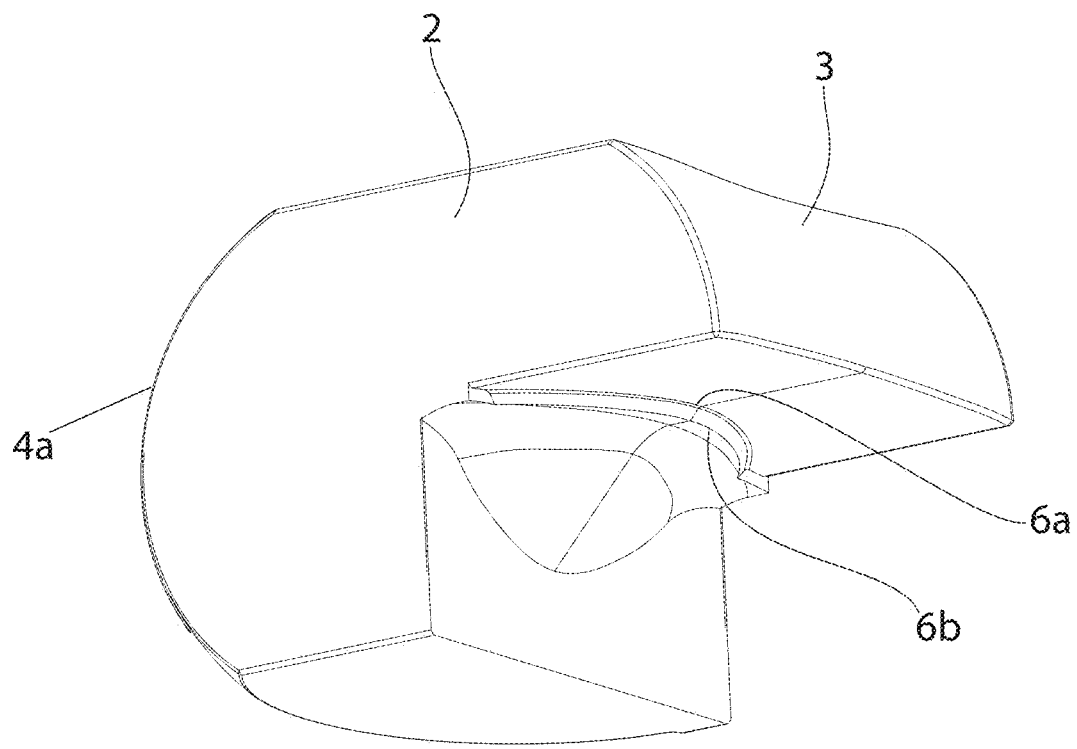
FIG. 7—a still further embodiment of an optical element

A third optical element 2c, which is arranged below the second optical element 2b, has a third anterior optic 7c, wherein the third optical element 2c and the third anterior optic 7c are preferably configured to produce an additional light function, for example a signlight. In order to produce a signlight light function, the third (or any other) optical element 2c can have a second light coupling area and a second optically effective aperture edge 6b lying vertically below its optically effective aperture edge 6a (see FIG. 7). Light that is coupled into the optical element 2c via the second light coupling area can impinge on the second optically effective aperture edge, wherein the second aperture edge is configured to produce a signlight light function in cooperation with the second anterior optic.

Each anterior optic 7a, 7b, 7c, 7d is arranged at a determined distance from the optical element 2a, 2b, 2c, 2d associated with it, which distance is defined as the distance between a centre point of the light decoupling surface 8 of the anterior optic 7a, 7b, 7c, 7d and a point of intersection of the optical axis x of the optical element 2a, 2b, 2c, 2d with the aperture edge 6a of the optical element 2a, 2b, 2c, 2d. The four optical elements 2a, 2b, 2c, 2d and the anterior optics 7a, 7b, 7c, 7d associated with the optical elements are arranged vertically above one another.

In the embodiment according to FIG. 1, the distance between the uppermost optical element 2a and the uppermost anterior optic 7a is smallest and becomes successively larger for the optical elements 2b, 2c, 2d vertically underneath. In the embodiment according to FIG. 1, the four anterior optics 7a, 7b, 7c, 7d are arranged in a plane, e.g. on a flat printed circuit board 9, wherein the plane is a vertical plane.

Figure 2:
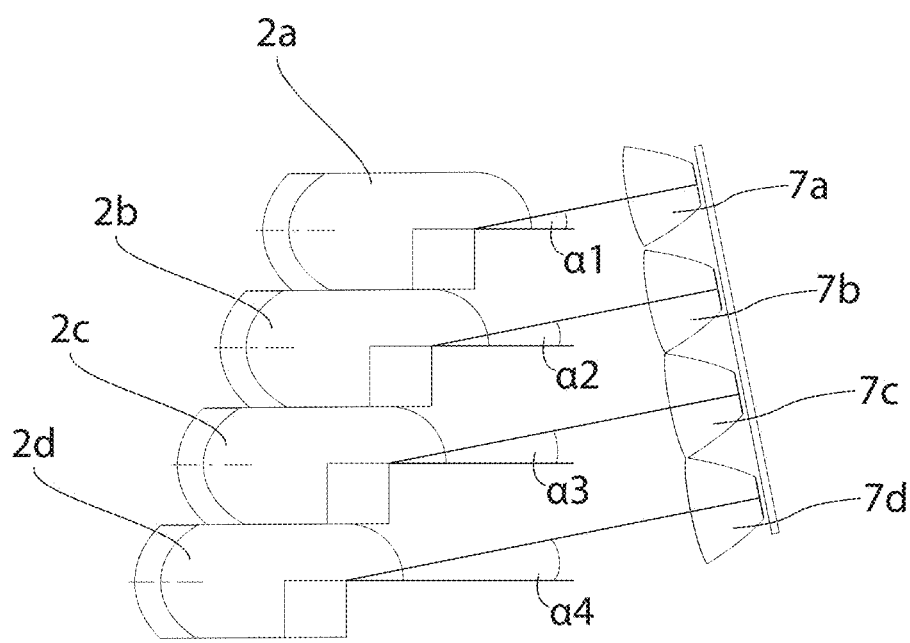
FIG. 2—a second embodiment of an optical system according to the invention.

In the embodiment according to FIG. 2, the four anterior optics 7a, 7b, 7c, 7d are arranged in a plane, e.g. on a flat printed circuit board (not shown), wherein the plane is oriented at an angle <0° relative to a vertical plane.

Figure 4A:
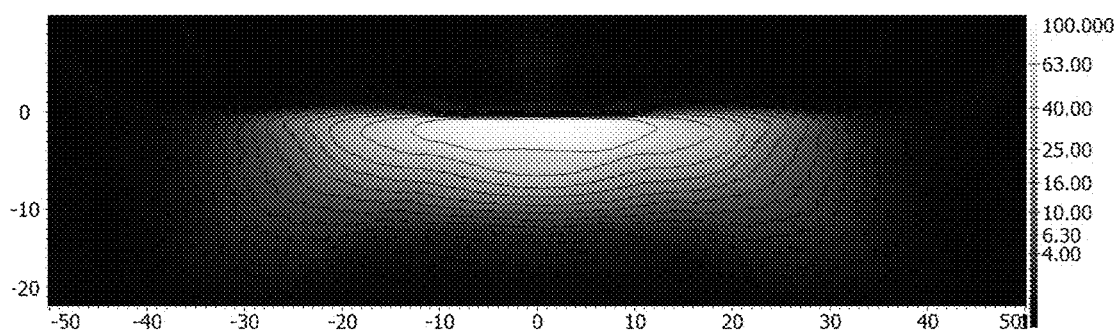
FIG. 4a—an isolux diagram of a light distribution.

FIG. 4a shows an isolux diagram of a light distribution that is producible with an optical element 2 according to FIG. 4.

Figure 5:
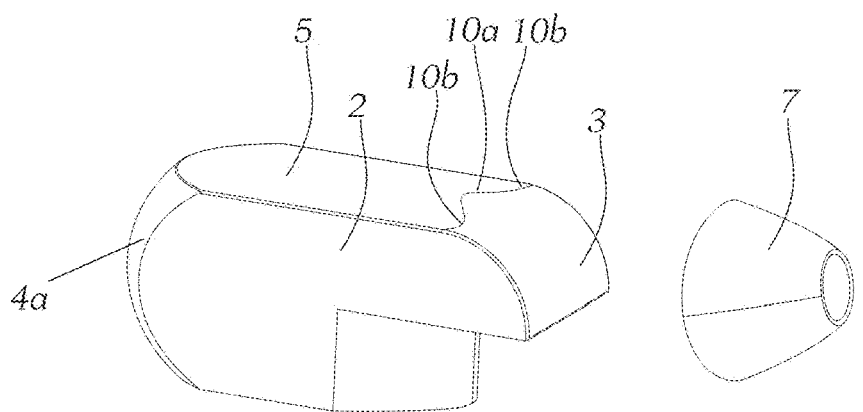
FIG. 5—a perspective view of a further optical element with an anterior optic.

FIG. 5 shows a further embodiment of an optical element 2. The light coupling area 3 of the optical element 2 is delimited by four side edges, wherein the uppermost side edge in the vertical direction has at least one curved edge section 10a, which is arranged between two non-curved edge sections 10b. By means of the curved edge section, the light intensity at a horizontal lower boundary of the light distribution can be homogenized in a light distribution producible with the optical element 2 and an anterior optic 7 associated with the optical element 2. This area is known to the person skilled in the art as segment 10. The side edges bordering the top side edge to the left and right have an essentially uniformly convex curvature. The bottom side edge in the vertical direction can be essentially straight. The side edges connected to the uppermost side edge as well as to the lowermost side edge can respectively be convex or concave.

Figure 5A:
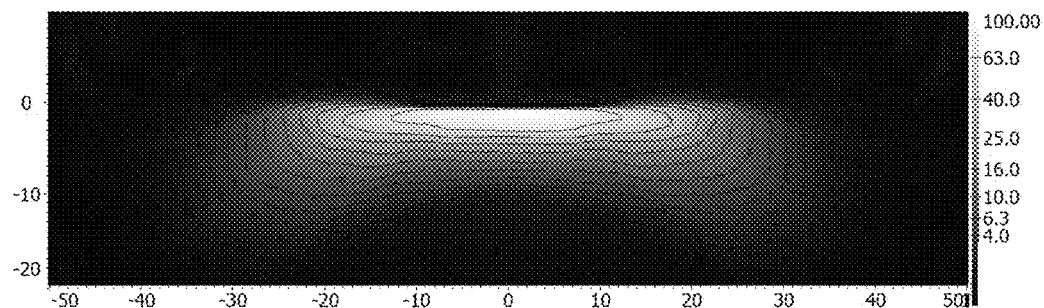
FIG. 5a—a further isolux diagram of a light distribution.

FIG. 5a shows an isolux diagram of a light distribution that is producible with an optical element 2 according to FIG. 5.

It is apparent in FIG. 5a that the horizontal line at −4° (the so-called segment 10) is straighter than in FIG. 4a. This straighter progression is brought about by the curved edge section of the light coupling area 3.

Figure 6:
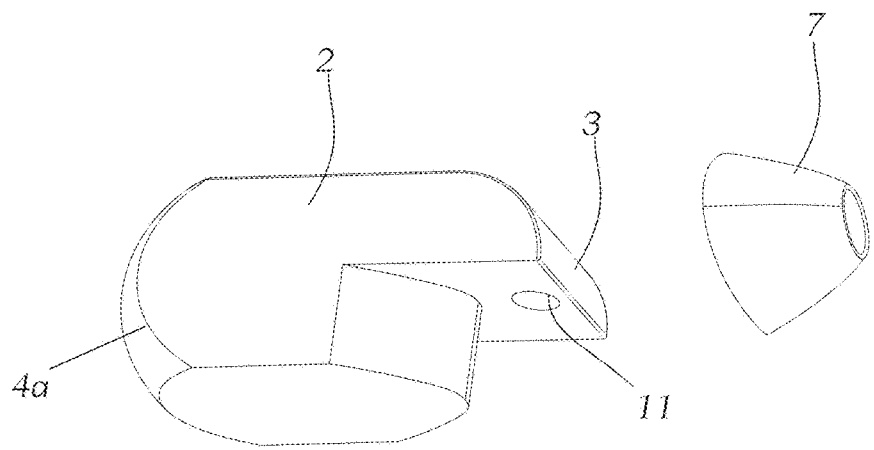
FIG. 6—a further embodiment of an optical element.

FIG. 6 shows a further embodiment of an optical element 2 in which the optical element 2 includes a hemispherical recess 11 by means of which the coupled light is deflected in such a manner that, when it is decoupled on the projection lens 4a, no light impinges on the segment 10 in the light distribution. In terms of its effect, the recess 11 is an alternative to the uppermost side edge in the vertical direction with a curved edge section 10a, which is arranged between two non-curved edge sections 10b. It is also possible to produce a light function according to FIG. 5 with the variant of an optical element shown in FIG. 6.

The invention claimed is:

1. An optical system (1) for a motor vehicle headlight, wherein the optical system (1) comprises:
    at least two optical elements (2a, 2b) and the at least two optical elements respectively comprising:
        a light coupling area (3), for coupling light beams into the optical element (2a, 2b),
        a light decoupling area (4), for decoupling the light beams coupled into the optical element (2a, 2b), wherein the light decoupling area (4) is configured as a projection lens (4a), which projection lens (4a) has an optical axis (x) and a focal surface (f), and
        a lateral surface (5) delimiting the optical element (2a, 2b) for deflecting the light beams coupled into the optical element (2a, 2b), the lateral surface (5) extends between the light coupling area (3) and the light decoupling area (4), wherein a section of the lateral surface (5) is configured as a beam aperture (6) with an optically effective aperture edge (6a), wherein the optically effective aperture edge (6a) is designed so as to form a bright/dark boundary in a far-field light distribution producible with the optical system, wherein the section of the lateral surface (5) configured as a beam aperture (6) lies in a defined plane,
        wherein the projection lens (4a) and the beam aperture (6) are arranged relative to each other in such a manner that the optical axis (x) of the projection lens (4a) lies in the defined plane and the optically effective aperture edge (6a) of the beam aperture (6) lies in the focal surface (f) of the projection lens (4a),
    wherein the optical elements (2a, 2b) include at least two anterior optics (7a, 7a), wherein one anterior optic (7a, 7b) is associated with each optical element (2a, 2b), wherein each anterior optic (7a, 7b) includes a light source and is configured to direct light from the light source onto the light coupling area (3) of the optical element (2a, 2b) associated with it, wherein:
        a first anterior optic (7a) of the at least two anterior optics (7a, 7b) is configured to direct light beams of the light source associated with it in the form of a first light beam bundle along a first coupling direction onto the light coupling area (3) of a first optical element (2a) associated with it, wherein the first light beam bundle is bundled after the coupling via the light coupling area (3) into an area of the optically effective aperture edge (6a) of the first optical element (2a) in such a manner that the first light beam bundle exhibits its highest light beam density at the optically effective aperture edge (6a), in a sectional plane orthogonal to the optical axis of the first optical element (2a), wherein a first part of the first light beam bundle is blocked by the beam aperture (6) and a second part of the first light beam bundle passes the aperture edge (6a) and propagates in the direction of the projection lens (4a), wherein the first coupling direction is oriented at a first coupling angle (α1) relative to the optical axis of the first optical element (2a),
        a second anterior optic (7b) of the at least two anterior optics (7a, 7b) is configured to direct light beams of the light source associated with it in the form of a second light beam bundle along a second coupling direction onto the light coupling area (3) of the optical element (2b) associated with it, wherein the second light beam bundle is bundled after the coupling via the light coupling area (3) into an area of the optically effective aperture edge (6a) of the optical element (2b) in such a manner that the second light beam bundle exhibits its highest light beam density at the optically effective aperture edge (6a), in a sectional plane orthogonal to the optical axis of the optical element (2b), wherein a first part of the second light beam bundle is blocked by the beam aperture (6) and a second part of the second light beam bundle passes the aperture edge (6a) and propagates in the direction of the projection lens (4a), wherein the second coupling direction is oriented at a second coupling angle (α2) relative to the optical axis of the optical element (2b),
    the first anterior optic (7a) and the first optical element (2a) are designed and configured to irradiate the first light beam bundle that forms a first far-field light distribution, wherein the first far-field light distribution exhibits a bright/dark boundary which is straight at least in sections and which lies below an HH line, and
    the second anterior optic (7b) and the second optical element (2b) are designed and configured to irradiate the second light beam bundle that forms a second far-field light distribution, wherein the second far-field light distribution lies below the bright/dark boundary of the first far-field light distribution.

2. The optical system (1) according to claim 1, wherein the first far-field light distribution has a first gradient and the second far-field light distribution has a second gradient, wherein the first gradient is determined along a vertical section through the bright/dark boundary of the first far-field light distribution and the second gradient is determined along a vertical section through the bright/dark boundary of the second far-field light distribution, wherein the first gradient is smaller than the second gradient.

3. The optical system (1) according to claim 2, wherein the first far-field light distribution satisfies required brightness values in points 50V and 50R in a low-beam light distribution.

4. The optical system (1) according to claim 1, wherein the first light beam bundle, which forms the first far-field light distribution, at least partially overlaps with the second light beam bundle, which forms the second far-field light distribution, in a far field, which lies at a distance of 25 m from the optical system (1).

5. The optical system (1) according to claim 4, wherein the first light beam bundle and the second light beam bundle do not overlap in a near field, which lies at a distance of up to 200 mm in front of the optical system (1).

6. The optical system (1) according to claim 1, wherein the first optical element (2a) and the second optical element (2b) are identical in design.

7. The optical system (1) according to claim 6, wherein the first coupling angle (α1) and the second coupling angle (α2) are different, wherein the optical axes of the first (2a) and second (2b) optical elements are oriented parallel to each other.

8. The optical system (1) according to claim 1, wherein the first anterior optic (7a) and the second anterior optic (7b) are configured differently, wherein light decoupling surfaces (8) of the first (7a) and second (7b) anterior optics via which the light of the light source is irradiated in a direction of the respective optical element (2a, 2b) are designed to be different in size.

9. The optical system (1) according to claim 1, wherein the first anterior optic (7a) is arranged relative to the first optical element (2a) at a first distance, which is defined as the distance between a centre point of the light decoupling surface (8) of the first anterior optic (7a) and a point of intersection of the optical axis (x) of the first optical element (2a) with the aperture edge (6a) of the first optical element (2a), and the second anterior optic (7b) is arranged relative to the second optical element (2b) at a second distance, which is defined as the distance between a centre point of the light decoupling surface (8) of the second anterior optic (7b) and an intersection point of the optical axis (x) of the second optical element (2b) with the aperture edge (6a) of the second optical element (2b), wherein the first distance is smaller than the second distance.

10. The optical system (1) according to claim 1, wherein the first optical element (2a) and the first anterior optic (7a) are arranged vertically above the second optical element (2b) and the second anterior optic (7b), wherein the first optical element (2a) is arranged relative to the second optical element (2b) in such a manner that the projection lens (4a) of the first optical element (2a) is arranged so as to be offset relative to the projection lens (4a) of the second optical element (2b) along a direction with an orientation parallel to the optical axis (x) of the first optical element (2a), wherein the light coupling area (3) of the first optical element (2a) and/or of the second optical element (2b) has a curved surface, wherein the light coupling area (3) of the first optical element (2a) and/or of the second optical element (2b) is configured to have the shape of a spherical segment.

11. The optical system (1) according to claim 1, wherein the first light beam bundle which is producible with the first optical element (2a) and which forms the first far-field light distribution has a first horizontal irradiation angle and the second light beam bundle which is producible with the second optical element (2b) and which forms the second far-field light distribution has a second horizontal irradiation angle, wherein the first horizontal irradiation angle is less than the second irradiation angle.

12. The optical system (1) according to claim 1, wherein the respective first and second far-field light distribution producible with the respective first (2a) and second (2b) optical elements each have a brightness maximum, wherein the optical axis (x) of the second optical element (2b) is inclined relative to the optical axis (x) of the first optical element (2a) at an angle of inclination which is greater than 0°, wherein the angle of inclination is such that the brightness maximum of the second far-field light distribution lies within the brightness maximum of the first far-field light distribution.

13. The optical system (1) according to claim 12, wherein the angle of inclination is 0.1° to 0.5°.

14. The optical system (1) according to claim 1, wherein a shading element is arranged between the first (2a) and the second (2b) optical element, which shading element is configured to block scattered light irradiated by the first anterior optic (7a) in a direction of the second optical element (2b).

15. The optical system (1) according to claim 1, wherein the light coupling area (3) of the first optical element (2a) is delimited by four side edges, wherein an uppermost side edge in the vertical direction has at least one curved edge section arranged between two non-curved edge sections, wherein side edges lying in a vertical plane, which lie below the uppermost side edge in a vertical direction have a uniform concave or convex curvature, wherein a lowermost side edge in the vertical direction is straight.

16. The optical system (1) according to claim 1, wherein the second optical element (2b) has a second light coupling area and a second optically effective aperture edge that lies vertically below its optically effective aperture edge (6), wherein light coupled into the optical element (2b) via the second light coupling area impinges on the second optically effective aperture edge, wherein the second aperture edge is configured to produce a side light distribution in cooperation with the second anterior optic.

17. The optical system (1) according to claim 1, wherein the first anterior optic (7a) and the second anterior optic (7b) respectively have a light decoupling surface (8) arranged in the same plane, wherein the plane is arranged orthogonally to the optical axis (x) of the first optical element (2a).

18. The optical system (1) according to claim 1, wherein the defined plane in which lies the section of the lateral surface (5) configured as a beam aperture (6) is essentially a horizontal plane in a state in which the optical system (1) is installed in a motor vehicle headlight, wherein the light sources of the first (7a) and second (7b) anterior optics lie in the same flat surface, wherein the light sources of the first (7a) and second (7b) anterior optics are arranged on the same flat printed circuit board.

19. The optical system (1) according to claim 1, wherein exactly one anterior optic (7a, 7b) is associated with each optical element (2a, 2b).

20. A motor vehicle headlight with an optical system according to claim 1.

* * * * *